United States Patent
Clayton

(10) Patent No.: US 7,738,397 B2
(45) Date of Patent: Jun. 15, 2010

(54) GENERATING TOPOLOGY INFORMATION IDENTIFYING DEVICES IN A NETWORK TOPOLOGY

(75) Inventor: Michele C. Clayton, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 1119 days.

(21) Appl. No.: 10/787,074

(22) Filed: Feb. 19, 2004

(65) Prior Publication Data

US 2005/0185599 A1    Aug. 25, 2005

(51) Int. Cl.
 *H04L 12/28* (2006.01)
(52) U.S. Cl. .................... 370/254; 370/351
(58) Field of Classification Search .......... 370/254
 See application file for complete search history.

(56) References Cited

U.S. PATENT DOCUMENTS

| | | | |
|---|---|---|---|
| 5,706,440 A | 1/1998 | Compliment et al. | |
| 6,038,400 A | 3/2000 | Bell et al. | |
| 6,351,375 B1 | 2/2002 | Hsieh et al. | |
| 6,377,987 B1 * | 4/2002 | Kracht | 709/220 |
| 6,496,484 B1 * | 12/2002 | Suzuki | 370/254 |
| 6,553,005 B1 | 4/2003 | Skirmont et al. | |
| 2003/0076788 A1 | 4/2003 | Grabauskas et al. | |

FOREIGN PATENT DOCUMENTS

| | | |
|---|---|---|
| EP | 1363429 | 11/2003 |
| GB | 2354137 | 3/2001 |

OTHER PUBLICATIONS

Fairchild, Steven. "Expander Configuration Details," T10 Technical Committee memorandum, document ID XP-002327110; Sep. 17, 2002; 45 pp.
PCT/US2005/002990 International Search Report and Written Opinion mailed May 17, 2005.
PCT/US2004/040418 International Search Report and Written Opinion mailed Apr. 29, 2005.
US2003/0184902 published Oct. 2, 2003; U.S. Appl. No. 10/246,849, filed Sep. 18, 2002.
PCT/US2004/040138 International Search Report & Written Opinion mailed Sep. 23, 2005.

(Continued)

*Primary Examiner*—Chirag G Shah
*Assistant Examiner*—Yong Zhou
(74) *Attorney, Agent, or Firm*—Konrad Raynes & Victor LLP; David W. Victor

(57) ABSTRACT

Provided is a method, system, and article of manufacture for generating topology information including information on local interfaces in a device and remote interfaces in at least one remote device that connect to the local interfaces identified in the topology information. For each connected remote interface, a determination is made of a device type of the one remote device including the remote interface. For each local interface connecting to one remote interface in one remote device of a specified device type, communication initiated with the remote interface to access remote topology information from the remote device indicating devices attached directly and indirectly to the remote device.

22 Claims, 9 Drawing Sheets

OTHER PUBLICATIONS

ANSI INCITS 376-2003: Serial Attached SCSI (SAS).

EP Office Action, Jun. 26, 2007, for EP Application No. 05712436.4-1244, 6 pp.

Official Letter, Jul. 23, 2008, for Taiwan Application No. TW94103380, 16 pp.

American National Standards Institute, "Fiber Channel Arbitrated Loop (FC-AL-2)", *American National Standard for Information Technology*, 1999, pp. i-v & 1-16.

American National Standards Institute, "Fiber Channel—Framing and Signaling (FC-FS)", *American National Standard for Information Technology*, Revision 1.80, Apr. 9, 2003, pp. i-xlvi & 1-18.

Deyring, K-P., "Serial ATA: High Speed Serialized AT Attachment", Jan. 7, 2003, Revision 1.0a, pp. 1-22.

Elliot, R.C. (Ed.), "Information Technology- SCSI Enclosure Services-2 (SES-2)", *Project T10/1559-D*, Jul. 15, 2003, Revision 4, pp. i-xiv & 1-79.

Elliot, R.C. (Ed.), "Information Technology- Serial Attached SCSI (SAS)", *Project T10/1562-D*, Jul. 9, 2003, Revision 5, pp. i-xxxii & 1-432.

Elliot, R., "Serial Attached SCSI Architecture", Sep. 2003, pp. 1-46.

Fairchild, S., "Expander Configuration Details", *T10 Document 02-359*, Sep. 9, 2002, pp. 1-17.

Fairchild, S., "SAS Expander Initiator Based Configuration", Jul. 12, 2002, pp. 1-32.

IEEE Computer Society, "Part 3: Carrier Sense Multiple Access With Collision Detection (CSMA/CS) Access Method and Physical Layer Specification", *IEEE Standard for Information Technology 802.3*, 2002, pp. 1-32.

McLean, P.T. (Ed.), "Information Technology- AT Attachment with Packet Interface-6 (ATA/ATAPI-6)", *T13/1410D*, Feb. 26, 2002, Revision 3B, pp. 1-56.

PCI Special Interest Group, "PCI Local Bus Specification", Mar. 29, 2002, Revision 2.3, pp. i-xiv & 1-6.

Phillips Semiconductors, "The $I^2C$-Bus Specification", Version 2.1, pp. 1-46, Jan. 2000.

QLogic Corporation, "Enclosure Management Controller for Serial ATA", *Gem424 Data Sheet*, 2001, pp. 1-4.

U.S. Appl. No. 10/741,460, filed Dec. 18, 2003, entitled "Multiple Interfaces in a Storage Enclosure", invented by P.L. Seto.

U.S. Appl. No. 10/742,029, filed Dec. 18, 2003, entitled "An Adaptor Supporting Different Protocols", invented by P.L. Seto & D.N. Atallah.

U.S. Appl. No. 10/742,030, filed Dec. 18, 2003, entitled "Enclosure Management Device", invented by P.L. Seto.

U.S. Appl. No. 10/742,302, filed Dec. 18, 2003, entitled "Address Assignment for Adaptor Interfaces", invented by P.L. Seto.

U.S. Appl. No. 10/746,657, filed Dec. 23, 2003, entitled "Handling Redundant Paths Among Devices", invented by N. E. Marushak.

* cited by examiner

Topology Table Entry       FIG. 4

GENERATING TOPOLOGY INFORMATION IDENTIFYING DEVICES IN A NETWORK TOPOLOGY

BACKGROUND

1. Field

The present embodiments relate to generating topology information identifying devices in a network topology.

2. Description of the Related Art

An adaptor or multi-channel protocol controller enables a device coupled to the adaptor to communicate with one or more connected end devices over a connection according to a storage interconnect architecture, also known as a hardware interface, where a storage interconnect architecture defines a standard way to communicate and recognize such communications, such as Serial Attached Small Computer System Interface (SCSI) (SAS), Serial Advanced Technology Attachment (SATA), Fibre Channel, etc. Further details on the SAS architecture for devices and expanders is described in the technology specification "Information Technology—Serial Attached SCSI (SAS)", reference no. ISO/IEC 14776-150: 200x and ANSI INCITS.***:200x PHY layer (Jul. 9, 2003), published by ANSI (referred to herein as the "SAS Specification"); details on the Fibre Channel architecture are described in the technology specification "Fibre Channel Framing and Signaling Interface", document no. ISO/IEC AWI 14165-25; details on the SATA architecture are described in the technology specification "Serial ATA: High Speed Serialized AT Attachment" Rev. 1.0A (January 2003).

Devices may communicate through a cable or through etched paths on a printed circuit board when the devices are embedded on the printed circuit board. These storage interconnect architectures allow a device to maintain one or more connections with end devices through a direct connection to the end device or through one or more expanders. In the SAS/SATA architecture, a SAS port is comprised of one or more SAS PHYs, where each SAS PHY interfaces a physical layer, i.e., the physical interface or connection, and a SAS link layer having multiple protocol link layer. Communications from the SAS PHYs in a port are processed by the transport layers for that port. There is one transport layer for each SAS port to interface with each type of application layer supported by the port. A "PHY" as defined in the SAS protocol is a device object that is used to interface to other devices and a physical interface.

An expander is a device that facilitates communication and provides for routing among multiple SAS devices, where multiple SAS devices and additional expanders connect to the ports on the expander, where each port has one or more SAS PHYs and corresponding physical interfaces. The expander also extends the distance of the connection between SAS devices. With an expander, a device connecting to a SAS PHY on the expander may be routed to another expander PHY connected to a SAS device. Further details on the SAS architecture for devices and expanders is described in the SAS Specification.

A port in an adaptor or expander contains one or more PHYs. Ports in a device are associated with PHYs based on the configuration that occurs during an identification sequence. A port is assigned one or more PHYs within a device for those PHYs within that device that are configured to use the same SAS address during the identification sequence and that connect to attached PHYs that also transmit the same address during the identification sequence. A wide port has multiple PHYs and a narrow port has only one PHY. A wide link comprises the set of physical links that connect the PHYs of a wide port to the corresponding PHYs in the corresponding remote wide port and a narrow link is the physical link that attaches a narrow port to a corresponding remote narrow port.

The SAS specification provides two expander types, a fanout expander and an edge expander. A fanout expander may be located between edge expanders. An edge expander PHY connects to a fanout expander PHY, and each fanout expander PHY may connect to a separate edge expander, which edge expander connects to end devices. However, in the current SAS specification, there can only be one fanout expander in a domain. A domain comprises all devices that can be reached through an initiator port, where the port may connect to multiple target devices through one or more expanders or directly. Further, each edge expander device set shall not be attached to more than one fanout expander device. An edge expander device set may be attached to one other edge expander device set if that is the only other edge expander device set in the domain and there are no fanout expander devices in the domain.

After the identify and link initialization sequences where the initiator obtains the address of each PHY connected to one of its PHYs, the initiator performs link initialization to determine all devices that can be accessed from one port, otherwise known as the domain for that port. The initiator begins the discovery process by determining that an expander is attached and configures the attached expander if configuration is necessary. The initiator then traverses the topology by opening a Serial Management Protocol (SMP) connection to the attached expander device and querying each expander PHY in ascending order using the SMP DISCOVER function to discover the PHYs on devices connected to the expander PHYs. If the initiator discovers that a device attached to the expander PHY being queried is a further expander, then the initiator will issue SMP discovery requests to discover every device and its PHYs attached to that further expander. This process continues until the initiator discovers all target devices in the domain of each port on the initiator. This process is further repeated by every end device, i.e., initiator and target, in a topology to discover all connected devices in the topology.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
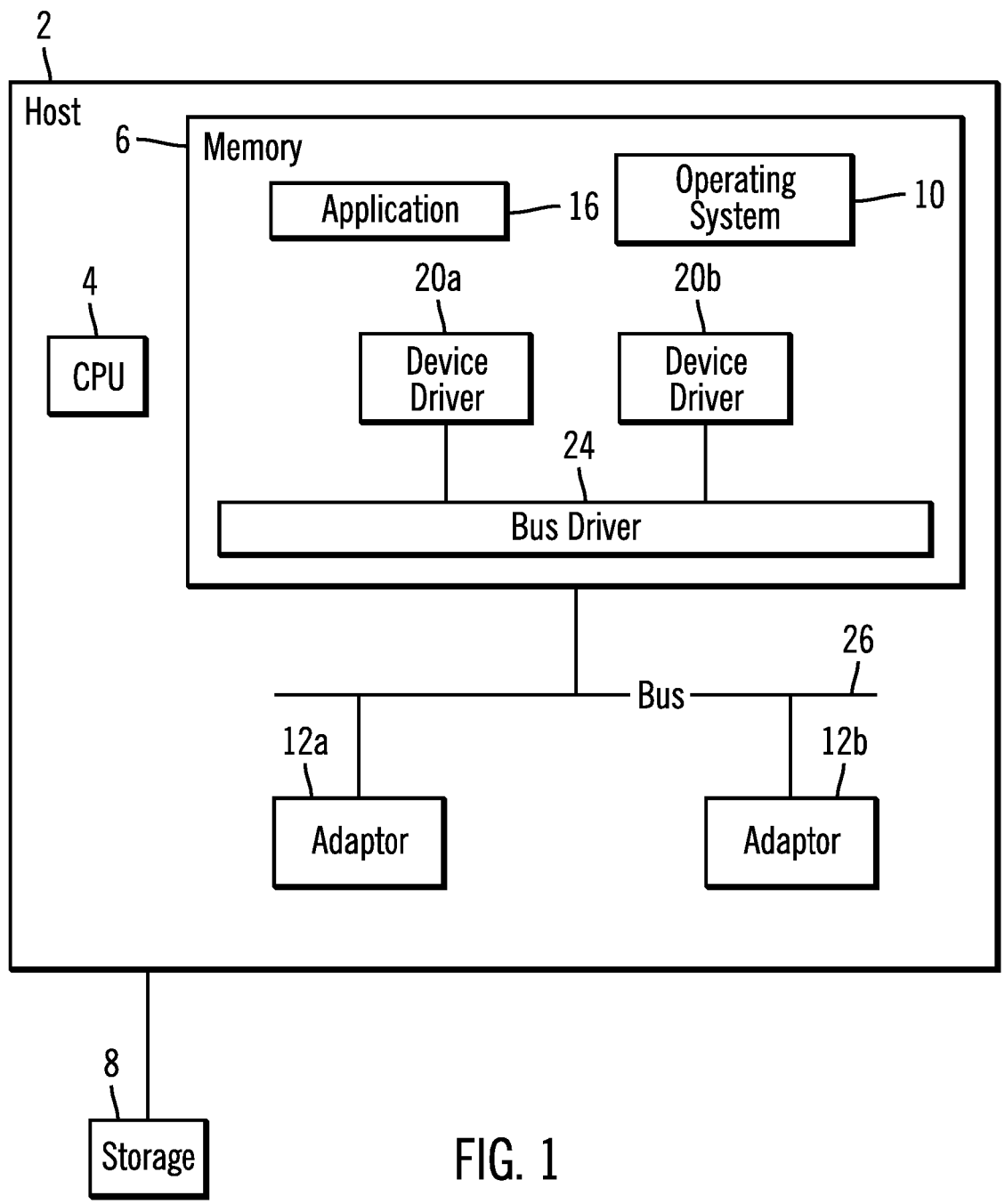
FIGS. 1 and 2 illustrate a system and adaptor in accordance with embodiments.

FIG. 1 illustrates a computing environment. A host system 2 includes one or more central processing units (CPU) 4 (only one is shown), a volatile memory 6, non-volatile storage 8, an operating system 10, and adaptors 12a, 12b which includes physical interfaces to connect with remote devices, comprising end devices, switches, expanders, storage devices, servers, etc. An application program 16 further executes in memory 6 and is capable of transmitting and receiving frames via one of the adaptors 12a, 12b. The host 2 may comprise any computing device known in the art, such as a mainframe, server, personal computer, workstation, laptop, handheld computer, telephony device, network appliance, virtualization device, storage controller, etc. Various CPUs 4 and operating system 10 known in the art may be used. Programs and data in memory 6 may be swapped into storage 8 as part of memory management operations.

The operating system 10 may load a device driver 20a and 20b for each storage interface supported in the adaptor 12 to enable communication with a device communicating using the same supported storage interface and also load a bus interface 24, such as a Peripheral Component Interconnect (PCI) interface, to enable communication with a bus 26. Further details of PCI interface are described in the publication "PCI Local Bus, Rev. 2.3", published by the PCI-SIG. The operating system 10 may load device drivers 20a and 20b supported by the adaptors 12a, 12b upon detecting the presence of the adaptors 12a, 12b, which may occur during initialization or dynamically. In the embodiment of FIG. 1, the operating system 10 loads two device drivers 20a and 20b. For instance, the device drivers 20a and 20b may support the SAS and SATA storage interfaces, i.e., interconnect architectures. Additional or fewer device drivers may be loaded based on the number of storage interfaces the adaptors 12a and 12b supports.

Figure 2:
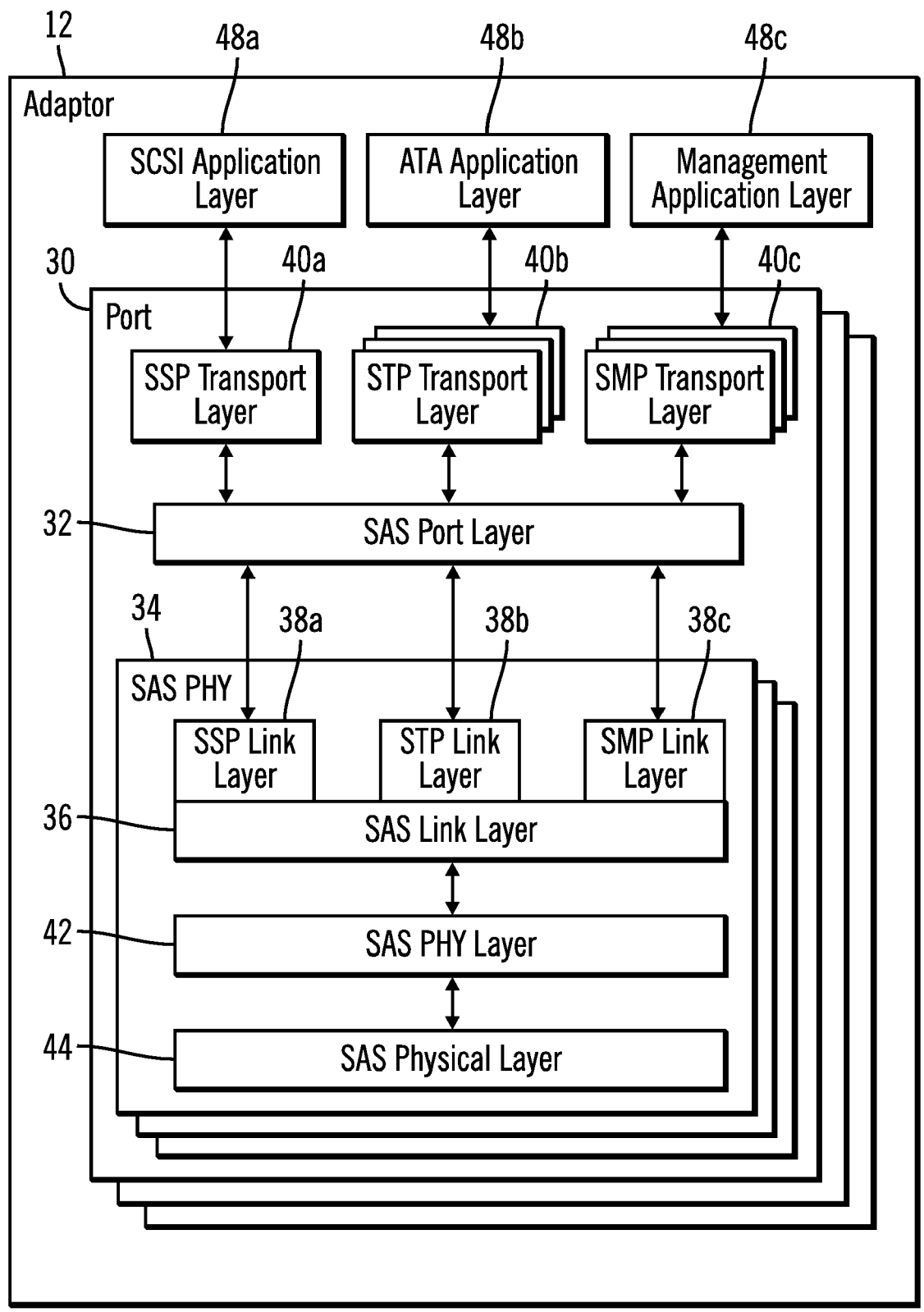

FIG. 2 illustrates an embodiment of an adaptor 12, which may comprise the adaptors 12a, 12b. FIG. 2 additionally illustrates a configuration that may be used in any SAS device, including a SAS expander, initiator, target, etc. Each SAS device includes one or more ports 30, where each port 30 contains a port layer 32 that interfaces with one or more SAS PHYs 34. Each PHY includes a link layer 36 having one or more protocol link layers. FIG. 2 shows three protocol link layers, including a Serial SCSI Protocol (SSP) link layer 38a to process SSP frames, a Serial Tunneling Protocol. (STP) layer 38b, a Serial Management Protocol (SMP) layer 38c, which in turn interface through port layer 32 with their respective transport layers, a SSP transport layer 40a, a STP transport layer 40b, and an SMP transport layer 40c, The three transport protocols STP, SSP, and SMP are defined in the SAS Specification, cited above.

Each PHY 34 for port 30 further includes a SAS PHY layer 42 and a physical layer 44. The physical layer 44 comprises the physical interface, including the transmitter and receiver circuitry, paths, and connectors. As shown, the physical layer 44 is coupled to the PHY layer 42. The PHY layer 32a, 32b . . . 32n may provide an encoding scheme, such as 8b10b, to translate bits, and a clocking mechanism, such as a phased lock loop (PLL). The PHY layer 32a, 32b . . . 32n may include a serial-to-parallel converter to perform the serial-to-parallel conversion and the PLL to track the incoming data and provide the data clock of the incoming data to the serial-to-parallel converter to use when performing the conversion. Data is received at the adaptor 12 in a serial format, and is converted by the SAS PHY layer 42 to the parallel format for transmission within the adaptor 12. The SAS PHY layer 42 further provides for error detection, bit shift and amplitude reduction, and the out-of-band (OOB) signaling to establish an operational link with another SAS PHY in another device, speed negotiation with the PHY in the external device transmitting data to adaptor 12, etc.

In the embodiment of FIG. 2, there is one protocol transport layer 40a, 40b, and 40c to interface with each type of application layer 48a, 48b, 48c in the application layer 50. The application layer 50 may be supported in the adaptor 12 or host system 2 and provides network services to the end users. For instance, the SSP transport layer 40a interfaces with a SCSI application layer 48a, the STP transport layer 40b interfaces with an Advanced Technology Attachment (ATA) application layer 48b, and the SMP transport layer 40c interfaces with a management application layer 48c. Further details of the ATA technology are described in the publication "Information Technology—AT Attachment with Packet Interface-6 (ATA/ATAPI-6)", reference no. ANSI INCITS 361-2002 (September, 2002). Further details on the operations of the physical layer, PHY layer, link layer, port layer, transport layer, and application layer and components implementing such layers described herein are found in the SAS Specification.

An adaptor 12 may further have one or more unique domain addresses, where different ports in an adaptor 12 can be organized into different domains or devices. The SAS address of a PHY comprises the SAS address of the port to which the PHY is assigned and that port SAS address is used to identify and address the PHY to external devices. A port is uniquely identified by the SAS address assigned to that port and the SAS address of the PHYs to which the PHYs in the port connect.

Figure 3:
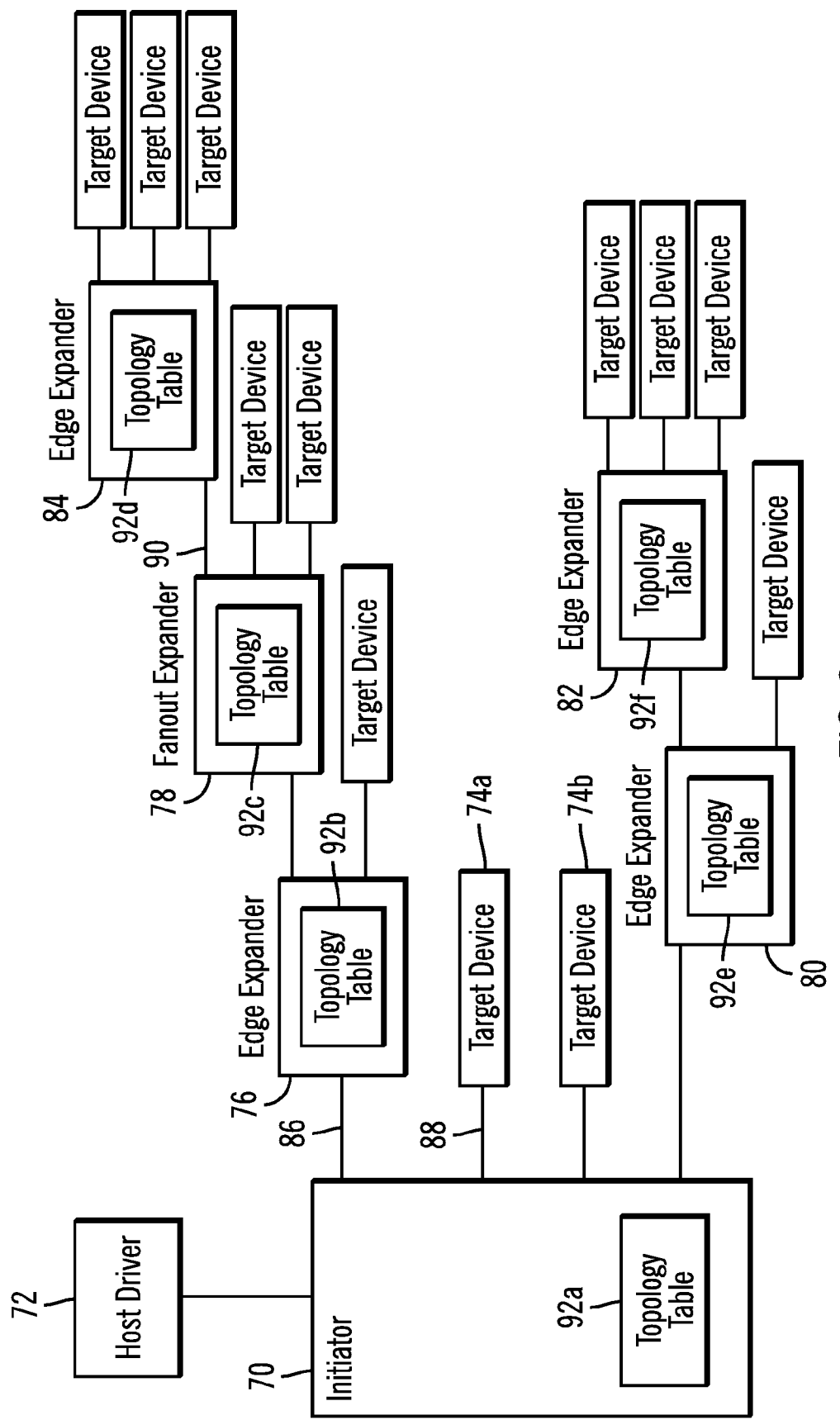
FIG. 3 illustrates an example of a network topology in accordance with embodiments.

FIG. 3 illustrates an example of a network topology. A SAS initiator 70 is configured via a host driver 72 or other silicon. The initiator 70 includes one or more ports where each port connects to an end device, e.g., target devices 74a, 74b, or one or more expanders, e.g., edge expander 76. The topology includes additional expanders 78, 80, 82, 84. Edge expanders, e.g., 76, 80, 82, 84, may connect to another edge expander or a fanout expander, e.g., 78, where a fanout expander 78 may connect to end/target devices or one or more edge expanders. Each connection, e.g., 86, 88, 90, etc., between any device in the topology may comprise a SAS port, where each SAS port may have one or more PHYs, where each PHY corresponds to one physical interface connection. A device is downstream with respect to an upstream device if the downstream device comprises an end device connected to the upstream device or if the downstream device comprises an expander connecting to further end devices or expanders to which the upstream device may connect. For instance, with respect to FIG. 3, all expanders 76, 78, 80, 82, and 84 are downstream with respect to initiator 70, expanders 78, 82, and 84 are downstream with respect to expander 76, etc.

Figure 4:
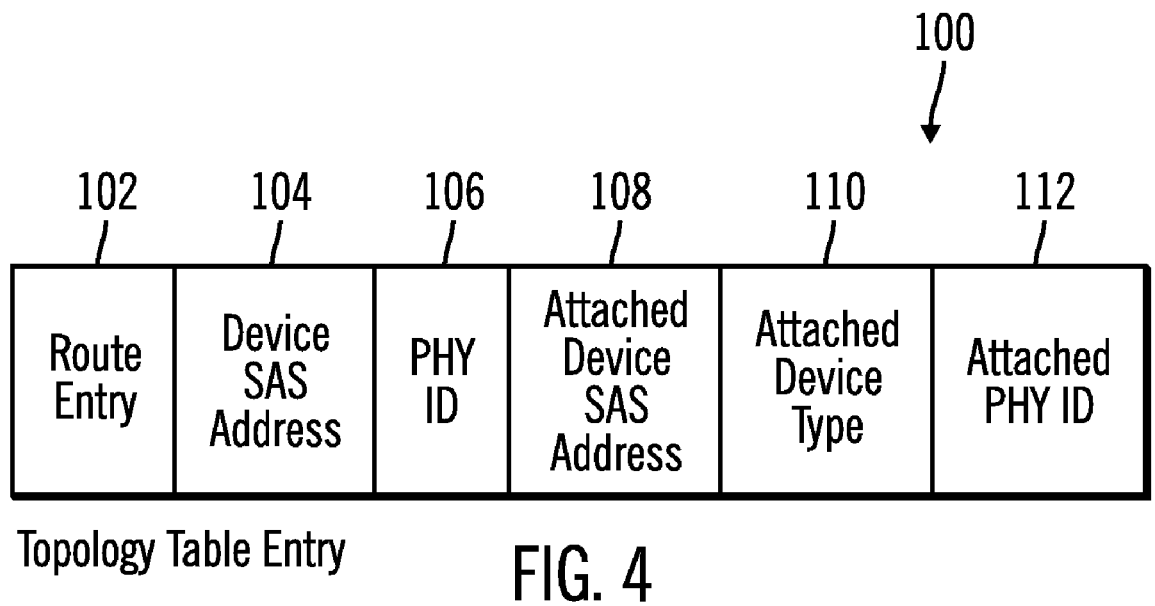
FIG. 4 illustrates information maintained in a topology table on connected devices in accordance with embodiments.

Each device further includes a topology table 92a, 92b, 92c, 92d, 92e, 92f that provides information on each PHY interface and on all devices in the domain of the port including the PHY Interface that may be reached through that PHY, including all expanders and target devices. The topology table 92a, 92b . . . 92f includes information on PHYs in devices connected directly or indirectly downstream from the device including the topology table 92b, 92b . . . 92f, where each device upstream from another device has a topology table cumulative of all topology tables downstream of that device FIG. 4 illustrates the fields in each entry 100 of a topology table 92a, 92b . . . 92f for one device at a level, including:

Route Entry 102: an index into the topology table 92a, 92b . . . 92f identifying a path in the topology between two devices.

Device SAS Address 104: A unique SAS address of a device, e.g., 70, 76, 78, 80, and 84.

PHY ID 106: a unique identifier of a PHY within the device having SAS address 104.

Attached Device SAS Address 108: the unique SAS address of the device to which the PHY having PHY ID 106 in device 104 connects.

Attached Device Type 110: The type of the attached device having SAS address 108, such as end device, edge expander, fanout expander, etc.

Attached PHY ID 112: The identifier of the PHY in the attached SAS device to which the PHY having PHY ID 106 connects.

Figure 5:
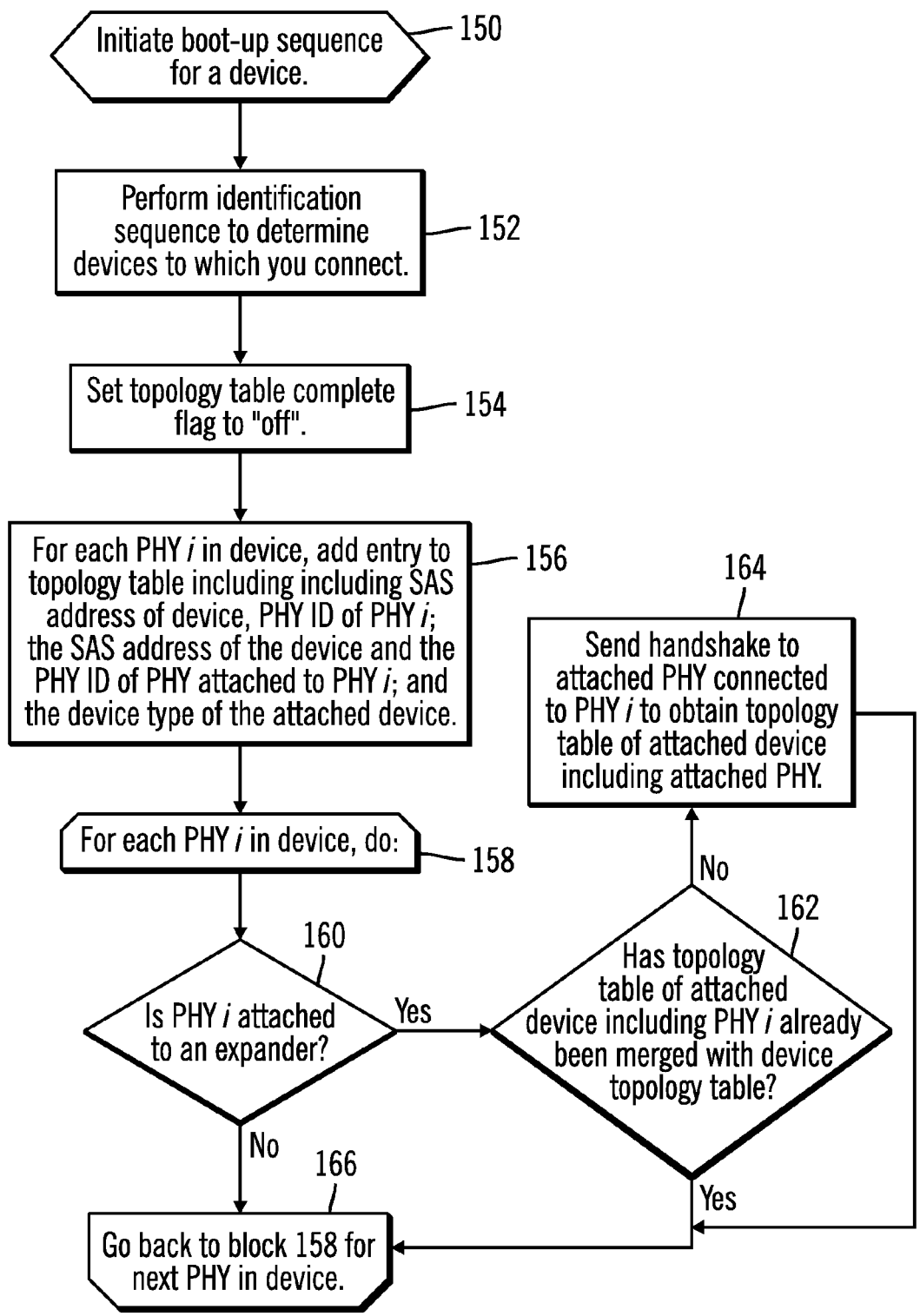
FIGS. 5, 6, 7, 8, and 9 illustrate operations performed by devices in the network topology to generate topology tables in accordance with embodiments.
Figure 6:
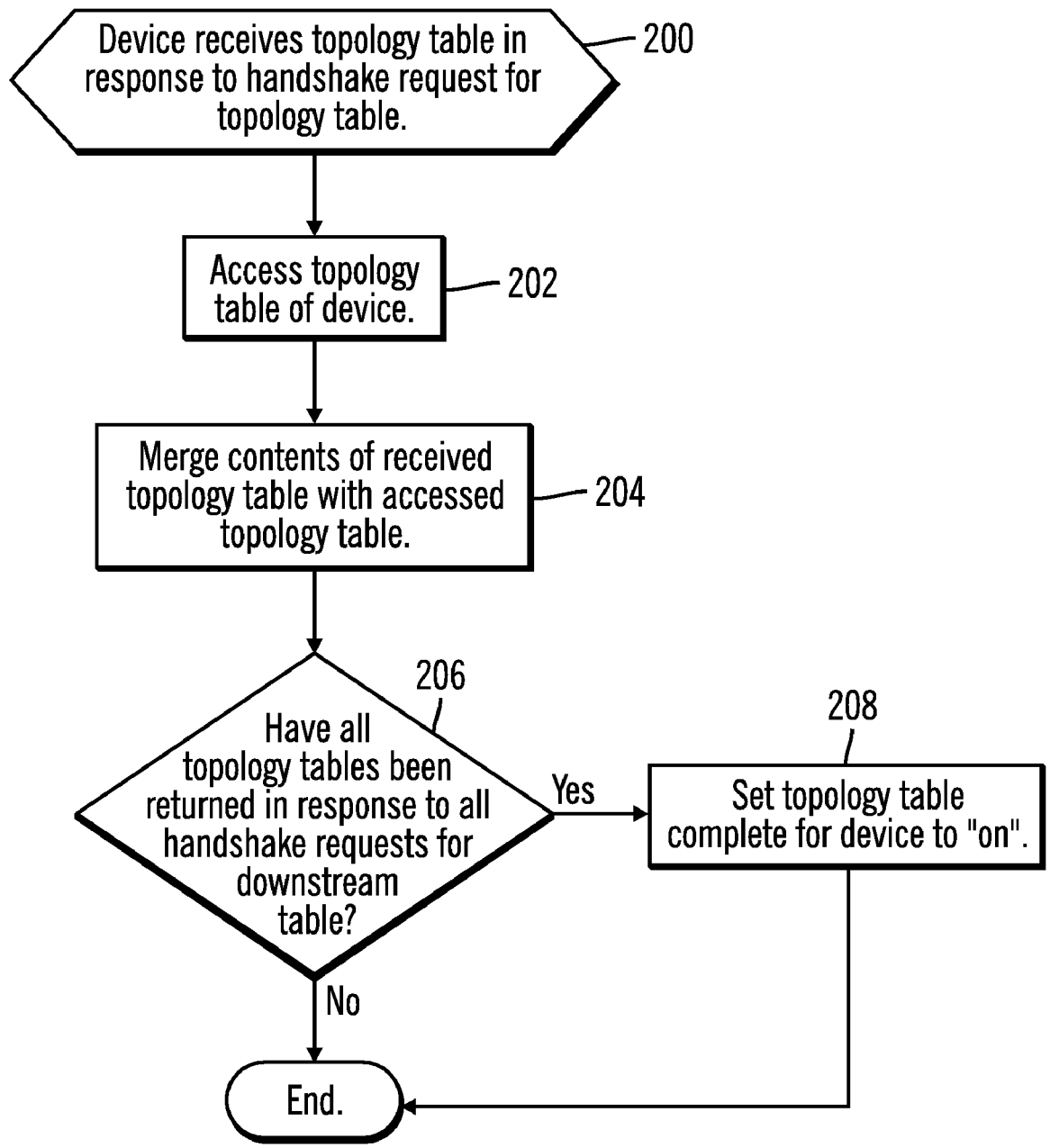
Figure 7:
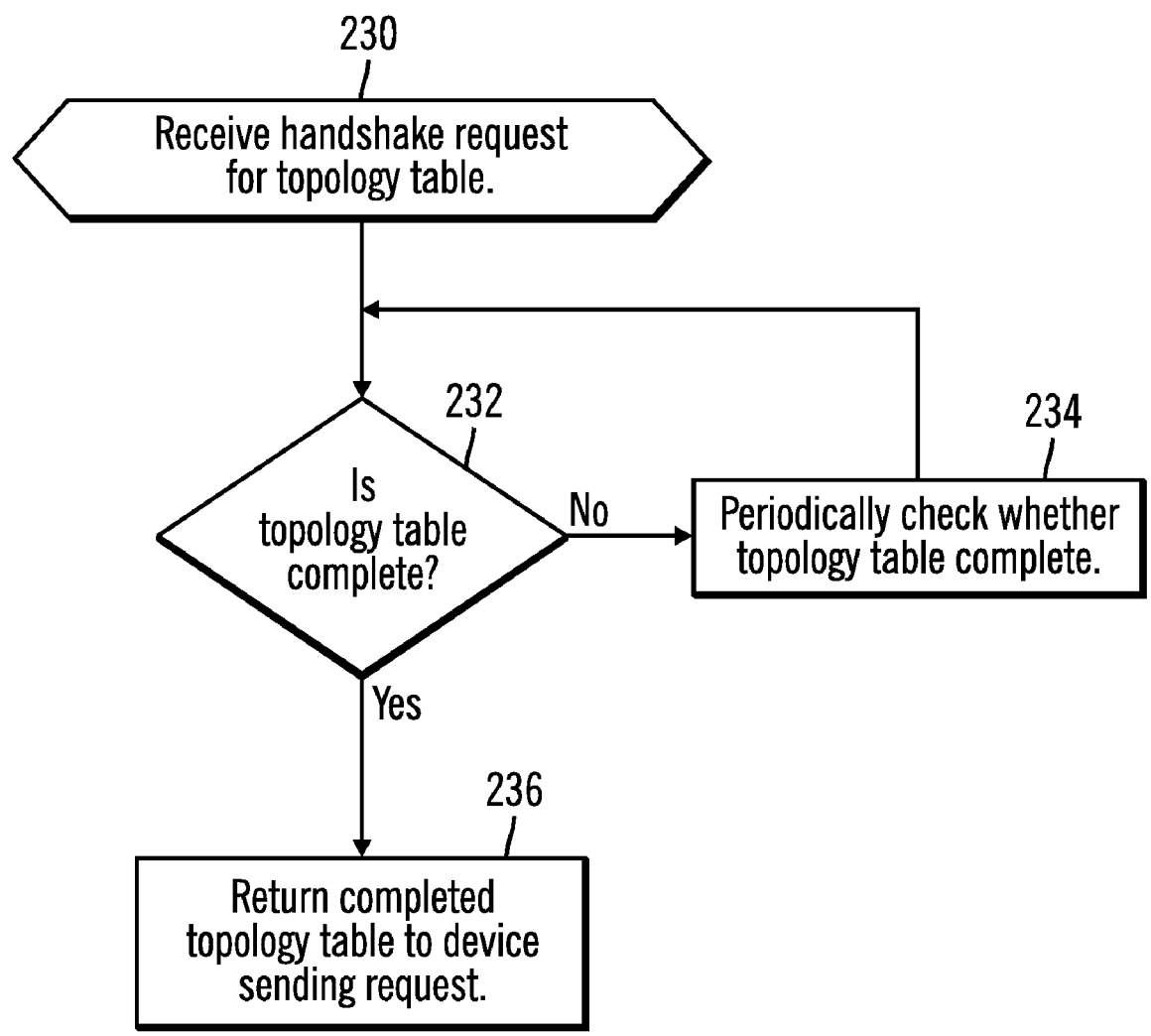

FIGS. 5, 6, and 7 illustrate operations performed by all devices in the topology to generate a topology table 92a, 92b . . . 92f including entries for each downstream device to which the device including the topology table 92a, 92b . . . 92f connects directly or indirectly. These discovery operations may be performed and invoked from within the application layer 48a, 48b, 48c (FIG. 2) or some other layer within the adaptor. With respect to FIG. 5, upon boot-up or reset (at block 150) and performing (at block 152) the identification and initialization sequences to determine all directly connected devices, a discovery process begins to build the topology table 92a, 92b . . . 92f for the device initiating the operations of FIG. 5. A topology table complete flag is set (at block 154) "off" indicating that the topology table 92a, 92b . . . 92f for the device 76, 78, 80, 82, 84, respectively, has not been completed. For each PHY i in the device from which discovery is being initiated, an entry is added (at block 156) to the topology table including: a route entry 102; the SAS address of the device 104 in which the operations of FIG. 5 are invoked; the PHY ID 106 of PHY i; the SAS address 110 of the device attached to PHY i; the PHY ID of the PHY attached to PHY I in the attached device; and the device type 110 of the device attached to PHY i.

A loop is then performed at blocks 158 through 166 for each PHY i in the device. If (at block 160) PHY i is attached to an expander and if (at block 162) the topology table 92a, 92b . . . 92f of the attached device connected directly to PHY i has not already been merged with the device topology table, then a handshake is sent (at block 164) to the attached PHY connected to PHY i to obtain the topology table of the attached device. In certain embodiments, a determination can be made that the topology table of the attached device has been merged if one entry in the topology table 92a, 92b . . . 92f has a device SAS address 104 of the attached device. If (at block 160) PHY i is not connected to an expander 76, 78, 80, 82, and 84 or if (at block 162) the topology table 92a, 92b . . . 92f of the attached device has already been merged with the device topology table, then (at block 164) control returns to block 158 to consider any further PHYs in the device.

FIG. 6 illustrates operations performed within a device 76, 78, 80, 82, 84 upon receiving (at block 200) a topology table 92a, 92b . . . 92f from a downstream device in response to a handshake request sent to that downstream device. The topology table 92a, 92b . . . 92f for the device is accessed (at block 202) to modify, which may require an exclusive lock. The contents of the received downstream table are then merged (at block 204) with the current topology table 92a, 92b . . . 92f in the device, which may comprise the initially built topology table 92a, 92b . . . 92f or a previously merged topology table 92a, 92b . . . 92f. If (at block 206) all the requested topology tables 92a, 92b . . . 92f have been returned in response to all handshake requests sent in the loop of blocks 158 through 166 (FIG. 5), then the topology table 92a, 92b . . . 92f is completed and the topology table complete flag is set (at block 208) to "on". If (at block 206) all downstream topology tables 92b, 92c, 92d have been returned in response to the handshake requests, then the topology table complete flag for the device is set (at block 208) to "on", indicating that the current state of the topology table 92a, 92b . . . 92f indicates all downstream devices.

FIG. 7 illustrates operations performed to process a handshake request for the topology table 92a, 92b . . . 92f from an upstream device. In response to receiving (at block 230) the handshake request for the native topology table 92a, 92b . . . 92f, if (at block 232) the topology table 92a, 92b . . . 92f is complete as indicated by the flag, then the completed topology table 92a, 92b . . . 92f is sent (at block 234) to the device initiating the request. In this way, the topology table 92a, 92b . . . 92f is only returned to an upstream device initiating the handshake after all the downstream topology tables have been incorporated into the topology table 92a, 92b . . . 92f.

Figure 8:
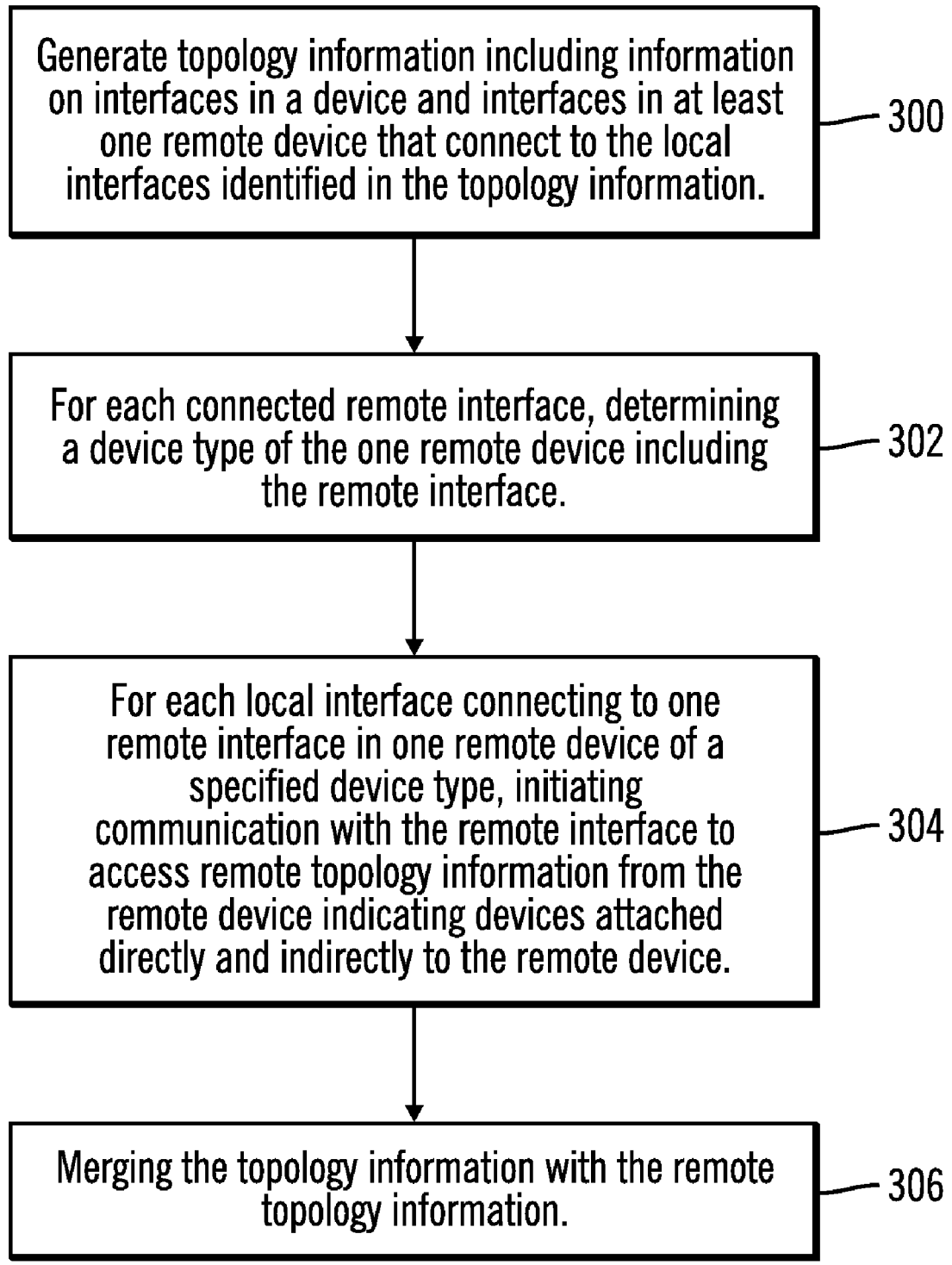
Figure 9:
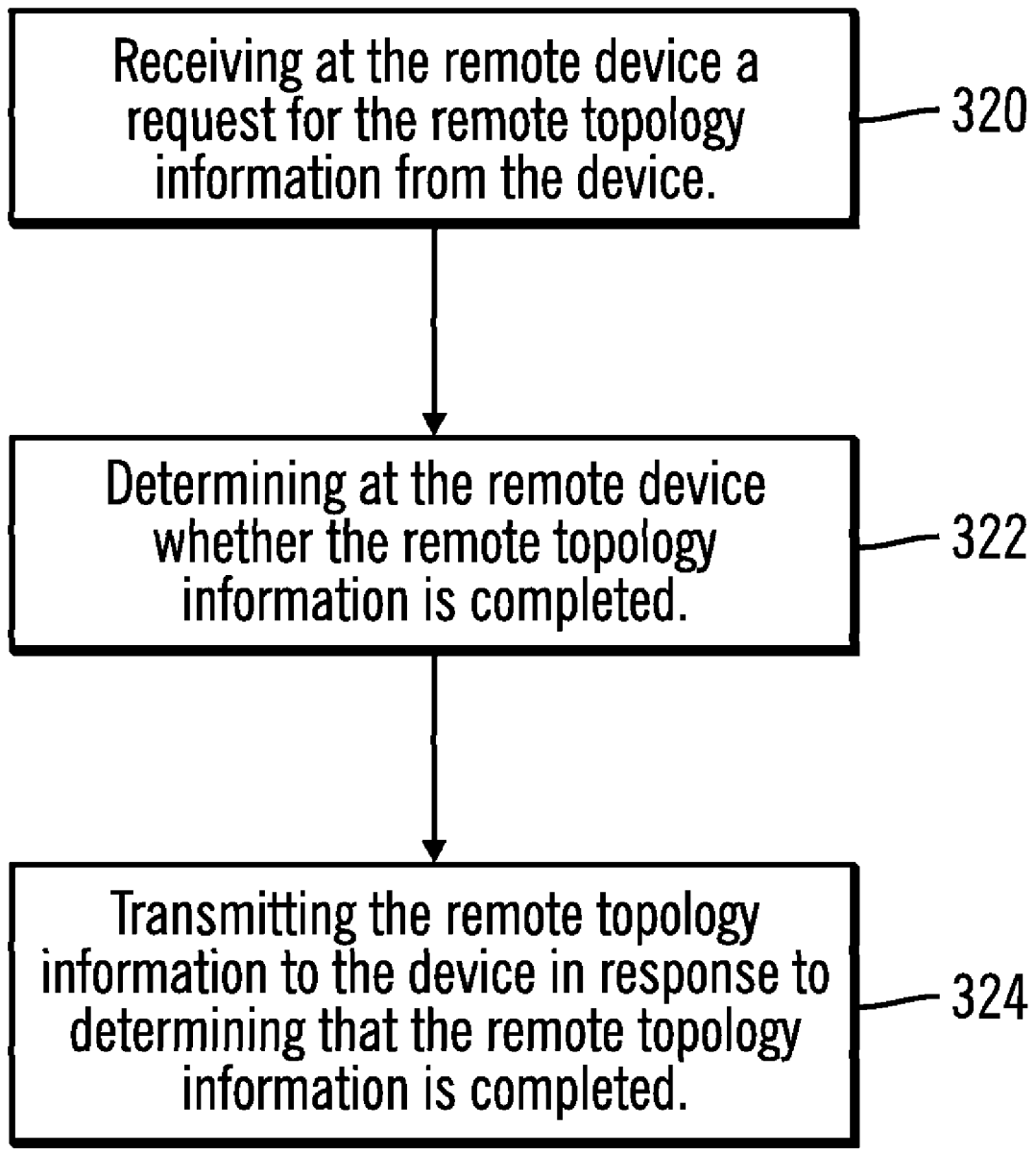

FIGS. 8 and 9 illustrate an additional embodiment for generating the topology information. At block 300, topology information is generated, including information on interfaces in a device and interfaces in at least one remote device that connect to the local interfaces identified in the topology information. The device may comprise a communication adaptor, such as a SAS adaptor, on a storage unit, server or other network device, and the remote devices may comprise intermediary devices, such as devices that extend the length and number of connections from the device to an end device. In SAS embodiments, the intermediary device may comprise a SAS expander. Further, the specified device type may comprise an expander.

An interface on a remote device, i.e., a remote interface, or on the device may comprise an adaptor or components thereof in the remote device that enable communication with the remote device. For each connected remote interface, a determination is made (at block 302) of a device type of the one remote device including the remote interface. For each local interface connecting to one remote interface in one remote device of a specified device type, communication is initiated (at block 304) with the remote interface to access remote topology information from the remote device indicating devices attached directly and indirectly to the remote device. The remote topology information may comprise information on devices to which the remote device including the remote device connects indirectly or directly, including downstream devices. The topology information may be merged (at block 306) with the remote topology information. The topology information and remote topology information may include information on downstream devices. Further, one downstream device may comprise an end device or an expander providing a direct or indirect connection to further end devices that may be connected to through the downstream expander.

FIG. 9 illustrates operations performed by a remote device upon receiving (at block 320) a request for the remote topology information from the device. The remote device determines (at block 322) whether the remote topology information is completed. The remote topology information may be completed in response to determining the device type of at least one additional device to which the remote device connects; receiving additional topology information from the at least one additional device to which the remote device connects that is of the specified device type; and merging the received additional topology information with the remote topology information.

Completed topology information may include an entry for devices to which the device including the completed topology information connects directly or indirectly, wherein each entry indicates a first address and first interface of a first device, a second address and second interface of a second device connected directly to the first device, and a device type of the second device, wherein the device including the topology information connects directly or indirectly to all first and second devices identified in the topology information. The remote topology information is transmitted (at block 324) to the device in response to determining that the remote topology information is completed.

Described embodiments provide a technique to alter the device discovery process of a network topology so that the initiator device determining all downstream devices in a domain does not have to separately issue discovery commands to every port in every node in the topology to determine cascading expanders and the connected end devices. Instead, with certain described embodiments, a device at any level may issue only one discovery request to the directly attached downstream device and, in response, receives a topology table having all downstream devices directly and indirectly connected to that interface, i.e., PHY. Described embodiments substantially reduce the number of operations an initiator performs to determine the topology of downstream devices because the initiator need only issue one discovery command for each attached expander. Further, the expanders may have generated their topology tables prior to the initiator request, thereby allowing the initiator to receive immediate information on the below topology if the attached expander has completed the expander discovery. Yet further, in the described embodiments, the number of discovery requests and nodes they travel are reduced because each device may only issue discovery requests for its directly attached downstream devices.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The term "circuitry" as used herein may refer to hardware logic, such as implemented in an ASIC, PGA or other hardware device, that performs computational operations or a combination of a processor and memory or storage device including code and instructions that are accessed and executed by the processor to perform operations.

In the described embodiments, layers were shown as operating within specific components, such as the expander and end devices. In alternative implementations, different layers may be programmed to perform the operations described herein.

In certain implementations, the device driver and network adaptor embodiments may be coupled to a storage controller, such as a disk controller, to connect to storage devices, such as a magnetic disk drive, tape media, optical disk, etc., where each interface, i.e., PHY, on the adaptor connects to one storage unit. In alternative implementations, the network adaptor embodiments may be included in a system that does not include a storage controller, such as certain hubs and switches.

In described embodiments, the storage interfaces supported by the adaptors comprised SATA and SAS. In additional embodiments, other storage interfaces may be supported. Additionally, the adaptor was described as supporting certain transport protocols, e.g. SSP, STP, and SMP. In further implementations, the adaptor may support additional transport protocols used for transmissions with the supported storage interfaces.

In described embodiments, the initially built and merged topology tables 92a, 92b . . . 92f include information on downstream devices, i.e., downstream expanders and end/target devices. In additional embodiments, the topology tables may be initially built and merged to include information on all connected devices, including those downstream as swell as upstream. In certain embodiments where the topology tables include information on upstream devices as well, during the initial building of the topology table, information on all directly connected devices to all PHY interfaces may be included in the topology table. During the discovery phase, devices exchange topology tables with both their directly connected upstream and downstream devices so the merged topology table indicates upstream and downstream devices in the topology. The devices may comprise SAS devices, the interfaces may comprise SAS PHYs, and each device in the topology may have a unique SAS address.

FIG. 3 illustrates an example of a network topology illustrating a specific number of target devices and expander. However, any acceptable number of expanders and target devices may be included in the network topology.

FIG. 4 illustrates an example of information included in the topology table entries. Additionally, the information on the devices in the topology and their connections may be stored in a different format than shown in FIG. 4 with additional or less information on each connection between two devices and the information on the devices.

The illustrated operations of FIGS. 5, 6, 7, 8, and 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The adaptor 12 may be implemented on a network card, such as a Peripheral Component Interconnect (PCI) card or some other I/O card, or on integrated circuit components mounted on a system motherboard or backplane.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

generating local topology information including information on local interfaces in a local device and remote interfaces in at least one downstream remote device that connect to the local interfaces identified in the local topology information, wherein the at least one downstream remote device comprises an end device or expander connecting to further end devices or expanders to which the local interfaces connect, wherein the local device is directly connected to the remote device, and wherein the local device, remote device, and other downstream devices directly and indirectly attached to the remote device are connected using a serial network technology;

for each connected remote interface, determining a device type of the downstream remote device including the remote interface; and for each local interface attached to one remote interface in one of the downstream remote devices whose determined device type is of a specified device type, initiating communication with the remote interface to access remote topology information from the downstream remote device indicating downstream devices attached directly and indirectly to the remote device, wherein the downstream devices with respect to the remote device comprise an end device or expander connecting to further end devices or expanders to which the remote device connects, and wherein the communication with the remote device to access the remote topology information comprises sending only one discovery request to the remote device to cause the remote device to gather the remote topology information indicating downstream devices attached directly and indirectly to the remote device, to periodically check whether the gathering of the remote topology information has completed, and to return the remote topology information to the local interface in response to determining that the gathering has completed.

2. The method of claim 1, further comprising:

merging the local topology information with the remote topology information.

3. The method of claim 1, wherein the specified device type comprises an expander.

4. The method of claim 1, wherein the remote topology information is completed if the remote topology information indicates information on downstream devices to which the remote device is directly and indirectly connected.

5. The method of claim 1, wherein the remote topology information is completed in response to completing:

determining the device type of at least one additional device to which the remote device connects;

receiving additional topology information from the at least one additional device to which the remote device connects that is of the specified device type; and merging the received additional topology information with the remote topology information.

6. The method of claim 1, wherein the remote topology information includes an entry for devices to which the remote device including the completed topology information connects directly to the first device, a second address and second interface of a second device connected directly identified in the remote topology information.

7. The method of claim 1, wherein the devices comprise SAS devices and wherein the interfaces comprise SAS PHYs, and wherein each device in the topology has a unique SAS address.

8. A system in communication with at least one remote device, wherein each remote device includes at least one remote interface and remote topology information, comprising:

at least one local interface;

circuitry performing operations, the operations comprising:

generating local topology information including information on local interfaces and remote interfaces in at least one downstream remote device that connect to the local interfaces identified in the local topology information, wherein the at least one downstream remote device comprises an end device or expander connecting to further end devices or expanders to which the local interfaces connect, wherein the local device is directly connected to the remote device, and wherein the local device, remote device, and other downstream devices directly and indirectly attached to the remote device are connected using a serial network technology;

for each connected remote interface, determining a device type of the downstream remote device including the remote interface; and for each local interface attached to one remote interface in one of the downstream remote devices whose determined device type is of a specified device type, initiating communication with the remote interface to access remote topology information from the downstream remote device indicating downstream devices attached directly and indirectly to the remote device, wherein the downstream devices with respect to the remote device comprise an end device or expander connecting to further end devices or expanders to which the remote device connects, and wherein the communication with the remote device to access the remote topology information comprises sending only one discovery request to the remote device to cause the remote device to gather the remote topology information indicating downstream devices attached directly and indirectly to the remote device, to periodically check whether the gathering of the remote topology information has completed and to return the remote topology information to the local interface in response to determining that the gathering has completed.

9. The system of claim 8, wherein the operations further comprise:

merging the local topology information with the remote topology information.

10. The system of claim 8, wherein the specified device type comprises an expander.

11. The system of claim 8, wherein the remote topology information includes an entry for devices to which the remote device including the completed topology information connects directly or indirectly, wherein each entry indicates a first address and first interface of a first device, a second address and second interface of a second device connected directly to the first device, and a device type of the second device, wherein the remote device including the remote topology information connects directly or indirectly to all first and second devices identified in the remote topology information.

12. A system in communication with at least one remote device and one upstream device, wherein each remote device includes at least one remote interface and remote topology information, comprising:
- at least one local interface;
- circuitry performing operations, the operations comprising:
  - receiving a request comprising only one discovery request for remote topology information from the upstream device, wherein the remote topology information includes information on the at least one local interface and remote devices in communication with the at least one local interface;
  - periodically checking whether the remote topology information is completed, wherein the remote topology information is completed if the remote topology information
- indicates information on downstream devices to which the remote device is directly and indirectly connected; and
  - transmitting the remote topology information to the upstream device in response to determining that the remote topology information is completed, wherein the one discovery request causes the circuitry to perform the periodically checking and transmitting of the remote topology information indicating the downstream devices directly and indirectly connected to the remote device, wherein the at least one local interface is directly connected to the upstream device, and wherein the upstream device, the at least one local interface, and the downstream devices are directly and indirectly attached to the at least one local interface are connected using a serial network technology.

13. The system of claim 12, wherein the remote topology information is completed in response to the circuitry completing:
- determining the device type of at least one additional connected remote device;
- receiving additional topology information from the at least one additional connected remote device that is of the specified device type; and
- merging the received additional topology information with the remote topology information.

14. A system in communication with at least one remote device, wherein each remote device includes at least one remote interface and remote topology information, comprising:
- at least one local interface;
- a motherboard;
- circuitry integrated with the motherboard performing operations, the operations comprising:
  - generating local topology information including information on the at least one local interface and remote interfaces in at least one downstream remote device that
- connect to the local interfaces identified in the local topology information, wherein the at least one downstream remote device comprises an end device or expander connecting to further end devices or expanders to which the local interfaces connect, wherein the local device is directly connected to the remote device, and wherein the local device, remote device, and other downstream devices directly and indirectly attached to the remote device are connected using a serial network technology;
  - for each connected remote interface, determining a device type of the one downstream remote device including the remote interface; and
  - for each local interface attached to one remote interface in one of the downstream remote devices whose determined device type is of a specified device type, initiating communication with the remote interface to access remote topology information from the downstream remote device indicating downstream devices attached directly and indirectly to the remote device, wherein the downstream devices with respect to the remote device comprise an end device or expander connecting to further end devices or expanders to which the remote device connects, and wherein the communication with the remote device to access the remote topology information comprises sending only one discovery request to the remote device to cause the remote device to gather the remote topology information indicating downstream devices attached directly and indirectly to the remote device, to periodically check whether the gathering of the remote topology information has completed and to return the remote topology information to the local interface in response to determining that the gathering has completed.

15. The system of claim 14, wherein the operations further comprise:
- merging the local topology information with the remote topology information.

16. The system of claim 15, wherein the specified device type comprises an expander.

17. An article of manufacture in communication with at least one remote device, each remote device having at least one interface, wherein the article of manufacture is performing operations, the operations comprising:
- generating local topology information including information on local interfaces and remote interfaces in at least one downstream remote device that connect to the local interfaces identified in the local topology information, wherein the at least one downstream remote device comprises an end device or expander connecting to further end devices or expanders to which the local interfaces connect, wherein the local device is directly connected to the remote device, and wherein the local device, remote device, and other downstream devices directly and indirectly attached to the remote device are connected using a serial network technology;
- for each connected remote interface, determining a device type of the one downstream remote device including the remote interface; and
- for each local interface attached to one remote interface in one of the downstream remote devices whose determined device type is of a specified device type, initiating communication with the remote interface to access remote topology information from the downstream remote device indicating downstream devices attached directly and indirectly to the remote device, wherein the downstream devices with respect to the remote device comprise an end device or expander connecting to further end devices or expanders to which the remote device connects, and wherein the communication with the remote device to access the remote topology information comprises sending only one discovery request to the remote device to cause the remote device to gather the remote topology information indicating downstream devices attached directly and indirectly to the remote device, to periodically check whether the gathering of the remote topology information has completed, and to return the remote topology information to the local interface in response to determining that the gathering has completed.

18. The article of manufacture of claim 17, wherein the operations further comprise:

merging the local topology information with the remote topology information.

19. The article of manufacture of claim 17, wherein the specified device type comprises an expander.

20. The article of manufacture of claim 17, wherein the remote topology information includes an entry for devices to which the remote device including the completed topology information connects directly or indirectly, wherein each entry indicates a first address and first interface of a first device, a second address and second interface of a second device connected directly to the first device, and a device type of the second device, wherein the remote device including the remote topology information connects directly or indirectly to all first and second devices identified in the remote topology information.

21. An article of manufacture in communication with at least one local interface, with at least one remote device and an upstream device, wherein each remote device includes at least one remote interface and remote topology information, wherein the article of manufacture is performing operations, the operations comprising:

receiving a request comprising only one discovery request for remote topology information from the upstream device, wherein the remote topology information includes information on the at least one local interface and remote devices in communication with the at least one local interface;

periodically checking whether the remote topology information is completed, wherein the remote topology information is completed if the remote topology information indicates information on downstream devices to which the remote device is directly and indirectly connected; and transmitting the remote topology information to the device in response to determining that the remote topology information is completed wherein the one discovery request causes the periodically checking and transmitting of the remote topology information indicating the downstream devices directly and indirectly connected to the remote device, wherein the at least one local interface is directly connected to the upstream device, and wherein the upstream device, the at least one local interface, and the downstream devices are directly and indirectly attached to the at least one local interface are connected using a serial network technology.

22. The article of manufacture of claim 21 wherein the remote topology information is completed in response to completing:

determining the device type of at least one connected additional device;

receiving additional topology information from the at least one additional connected device that is of the specified device type; and merging the received additional topology information with the remote topology information.

\* \* \* \* \*

UNITED STATES PATENT AND TRADEMARK OFFICE
CERTIFICATE OF CORRECTION

| | | |
|---|---|---|
| PATENT NO. | : 7,738,397 B2 | Page 1 of 1 |
| APPLICATION NO. | : 10/787074 | |
| DATED | : June 15, 2010 | |
| INVENTOR(S) | : M. C. Clayton | |

It is certified that error appears in the above-identified patent and that said Letters Patent is hereby corrected as shown below:

In the Claims:

Column 9, Line 65, "directly to the first device" should read --directly or indirectly, wherein each entry indicates a first address and first interface of a first device--.

Column 9, Line 66, "directly identified" should read --directly to the first device, and a device type of the second device, wherein the remote device including the remote topology information connects directly or indirectly to all first and second devices identified--.

Signed and Sealed this
Nineteenth Day of May, 2015

Michelle K. Lee
*Director of the United States Patent and Trademark Office*